(12) United States Patent
Grosspietsch et al.

(10) Patent No.: US 12,034,499 B2
(45) Date of Patent: Jul. 9, 2024

(54) MECHANISMS FOR REDUCTION OF OVERLAP DURING ZONE CASTING WITH ALTERNATIVE MAIN TRANSMITTERS AND TIME ALIGNMENT FOR OVERLAYED RADIO TRANSMISSIONS

(71) Applicant: LAZER ADDS, LLC, Wilmington, DE (US)

(72) Inventors: John Grosspietsch, Wilmington, DE (US); Chris Devine, Wilmington, DE (US)

(73) Assignee: LAZER ADDS, LLC.

( * ) Notice: Subject to any disclaimer, the term of this patent is extended or adjusted under 35 U.S.C. 154(b) by 103 days.

(21) Appl. No.: 17/855,004

(22) Filed: Jun. 30, 2022

(65) Prior Publication Data

US 2023/0006715 A1 Jan. 5, 2023

Related U.S. Application Data

(60) Provisional application No. 63/217,260, filed on Jun. 30, 2021, provisional application No. 63/217,263, filed on Jun. 30, 2021.

(51) Int. Cl.
| | |
|---|---|
| *H04B 7/06* | (2006.01) |
| *H04B 7/026* | (2017.01) |
| *H04B 7/155* | (2006.01) |
| *H04W 16/14* | (2009.01) |
| *H04W 16/18* | (2009.01) |
| *H04W 16/26* | (2009.01) |
| *H04W 72/30* | (2023.01) |

(52) U.S. Cl.
CPC ......... *H04B 7/026* (2013.01); *H04B 7/15507* (2013.01); *H04W 16/14* (2013.01); *H04W 16/18* (2013.01); *H04W 16/26* (2013.01); *H04W 72/30* (2023.01)

(58) Field of Classification Search
CPC ......... H04B 7/00; H04B 7/026; H04B 7/155; H04B 15/00; H04H 20/18; H04H 20/26; H04H 20/71; H04H 20/72; H04W 4/33; H04W 7/06; H04W 16/14; H04W 16/18; H04W 16/26; H04W 36/00; H04W 524/28; H04W 56/00; H04W 72/00; H04W 72/30
USPC ........ 370/312, 347; 375/260–267, 285, 376; 455/3.01, 63.1, 522
See application file for complete search history.

(56) References Cited

U.S. PATENT DOCUMENTS

2011/0065377 A1* 3/2011 Hieatt ................... H04H 20/67
455/3.01

\* cited by examiner

*Primary Examiner* — Shawkat M Ali
(74) *Attorney, Agent, or Firm* — Barnes & Thornburg LLP

(57) ABSTRACT

Radio broadcasting equipment and functionality enable a radio broadcaster to reduce the size of an interference overlap resulting from main transmitter and booster signal transmitter overlap during zone casting by using an alternate main transmitter with an antenna pattern that differs from the main transmitter antenna pattern during zone casts. Radio broadcasting equipment is also provided that provides a mechanism to ensure that the handoffs occur in the gaps between songs, advertisements, or other content of both the main and the zone casting signals.

20 Claims, 8 Drawing Sheets

Figure 1. Main Signal Coverage

Figure 2. Booster

Figure 3. ZoneCasting Overlap

MECHANISMS FOR REDUCTION OF OVERLAP DURING ZONE CASTING WITH ALTERNATIVE MAIN TRANSMITTERS AND TIME ALIGNMENT FOR OVERLAYED RADIO TRANSMISSIONS

CROSS REFERENCE AND PRIORITY CLAIM

This United States Non-provisional Patent application relies for priority on U.S. Provisional Patent Application Ser. No. 63/217,263, filed on Jun. 30, 2021, entitled "TIME ALIGNMENT FOR OVERLAYED RADIO TRANSMISSIONS" and 63/217,260, filed on Jun. 30, 2021, entitled "REDUCE OVERLAP DURING ZONE CASTING WITH ALTERNATE MAIN TRANSMITTER," the disclosures of which are all being incorporated by reference in their entireties.

FIELD

Disclosed embodiments are directed, generally, to radio broadcasting equipment, as system and methodologies and the use of a plurality of booster/auxiliary transmitters to augment a main transmitter(s) for a radio broadcast area.

BACKGROUND

As explained in U.S. Pat. No. 9,232,481, entitled "EQUIPMENT, SYSTEM AND METHODOLOGIES FOR ROBUST COVERAGE IN A BROADCAST AREA" and U.S. Pat. No. 8,862,048, "EQUIPMENT, SYSTEM AND METHODOLOGIES FOR segmentation OF LISTENING AREA INTO SUB-AREAS ENABLING DELIVERY OF LOCALIZED AUXILIARY INFORMATION" (both expressly incorporated by reference herein), a segmented listening area that is configured to deliver localized auxiliary information may utilize "zones" within the FCC defined service area of a radio broadcast transmitter associated with a particular broadcaster. These zones may contain 1 to N number of on-channel, same frequency boosters that broadcast, in a simulcast manner, during specific instances in time.

Although advertisers reach large audiences by purchasing commercial time from broadcast and Internet media providers, targeting advertisements to specific localized geographical areas is desired by advertisers.

As discussed in those references, in an FM implementation, the design of zones may be such that the signal power from the on-channel boosters in a zone may radiate a signal significantly stronger than the broadcaster's main station transmitter in the zone. Therefore, FM receivers in the zone capture on the on-channel booster signal rather than the main transmitter signal. Thus, a broadcaster can transmit different, local audio information to the specific zone. At the same time, there may exist several other on-channel zones within the listening area that are simultaneously, or independently, broadcasting different information that the broadcaster wants to transmit in that particular zone. These zones may be separated geographically so as not to emit transmission signals that interfere with each other.

Further, optionally, promotional content may be transmitted from the booster transmitter(s) in a Time Division Multiplex Access (TDMA) frame structure such that the information to be broadcast on each frequency does not overlap in time. As a result, the booster transmitter(s) can transmit on multiple RF frequencies separated by time, and provide localized auxiliary content transmission on different transmission frequencies within the particular zone(s) of more than one radio broadcaster.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

In accordance with at least one disclosed embodiment, radio broadcasting equipment is provided that enables a radio broadcaster to reduce the size of an interference overlap resulting from main transmitter and booster signal transmitter overlap during zone casting by using an alternate main transmitter with an antenna pattern that differs from the main transmitter antenna pattern during zone casts.

In accordance with at least one disclosed embodiment, radio broadcasting equipment is provided that provides a mechanism to ensure that the handoffs occur in the gaps between songs, advertisements, or other content of both the main and the zone casting signals.

BRIEF DESCRIPTION OF THE DRAWINGS

A more complete understanding of the present invention and the utility thereof may be acquired by referring to the following description in consideration of the accompanying drawings, in which like reference numbers indicate like features, and wherein.

DETAILED DESCRIPTION

Figure 1:
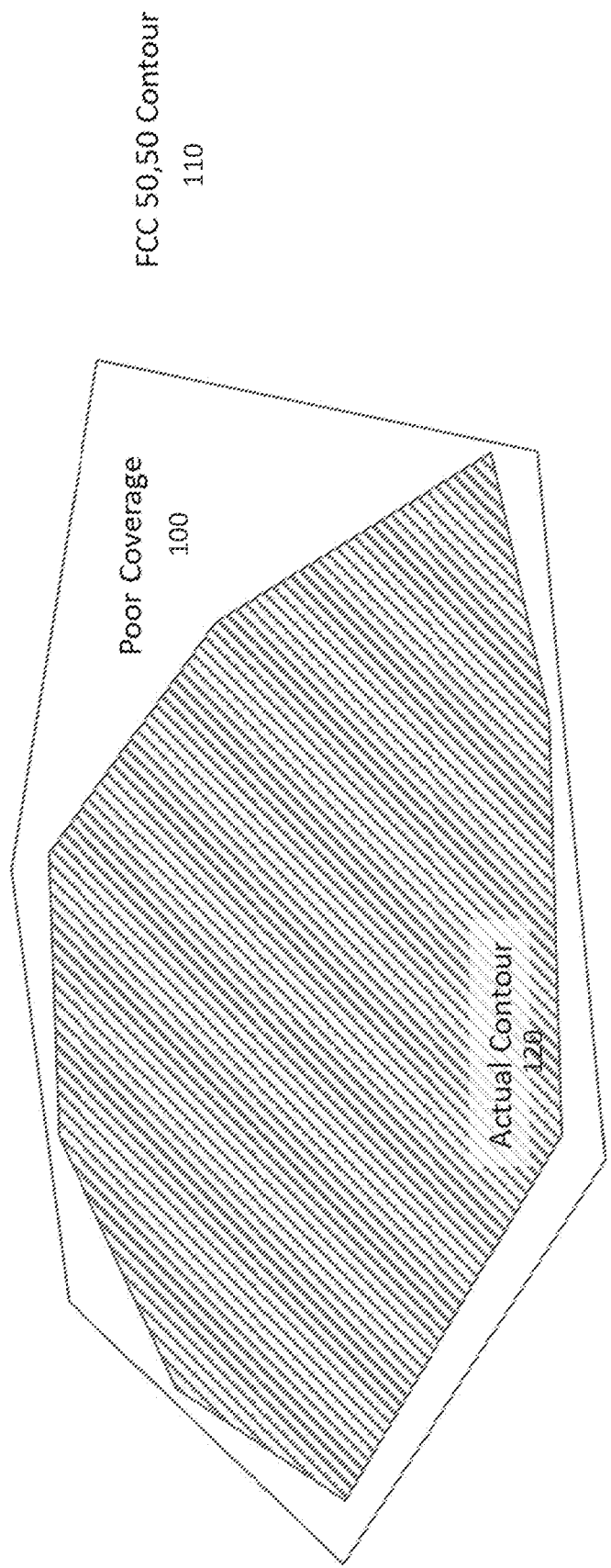
FIG. 1 shows an example of the usable coverage area for an radio broadcaster using only one main transmitter.

The description of specific embodiments is not intended to be limiting of the present invention. To the contrary, those skilled in the art should appreciate that there are numerous variations and equivalents that may be employed without departing from the scope of the present invention. Those equivalents and variations are intended to be encompassed by the present invention.

In the following description of various embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope and spirit of the present invention.

It should be understood that the term "radio broadcaster" is meant to include organizations and/or individuals involved in the broadcast of audio radio broadcasting area wide programming and localized auxiliary information. The term "broadcasting area wide programming" or "license coverage area" is meant to include, for example, programming content that is intended to be distributed throughout a particular broadcasting area; thus, depending on the format of the station, such programming may include, for example, talk radio programs, music programs, songs, etc. The term "broadcasting area wide programming" also encompasses programming distributed via radio networks to affiliated stations. Likewise, the term "localized auxiliary information" is meant to include, e.g., advertisements, public safety information, public service information, emergency broadcast information, etc. Thus, radio broadcasters are not limited to individuals or organizations owning licenses for radio broadcasting; however, the term radio broadcaster does include such individuals or organizations.

In explaining the operation of various disclosed embodiments, description of one or more "main transmitters" and "booster transmitters" is provided. It should be understood that the term "main transmitter" encompasses a transmitter that may be, for example, the only transmitter used by a radio broadcaster in a particular radio broadcasting area or it may be the most powerful (or one of the most powerful) transmitters in the radio broadcasting area.

To the contrary, the term "booster transmitter" (which is interchangeable with the term "signal boosters" and "auxiliary transmitters") includes low-power transmitters (relative to the maximum class of the main transmitter), which are conventionally used to improve communications in locations within the normal coverage area of a radio system where the radio signal is blocked or shielded due to natural terrain or man-made obstacles (e.g., to provide fill-in coverage but not increase the normal coverage area).

FM broadcasters make trade-offs when locating transmitters to cover an approved coverage area. Some broadcasters locate the main transmitter based on geography but are not able to provide coverage because of geographic or range impairments. FM broadcasters can increase coverage by adding booster transmitters to "fill-in" the areas not covered with the main signal. Various proprietary techniques exist for using multiple synchronized boosters to reliably increase coverage. By controlling the timing and power levels, booster signals may be designed to combine constructively with the main signal in regions where the main and booster signal overlap to increase coverage.

With this understanding in mind, U.S. Pat. No. 8,862,048 discloses use of a mechanism for reducing the power of a main signal during periods when booster transmitters are broadcasting auxiliary local content (zone casting). Although this mechanism is technically useful, one side effect of the approach is that it can reduce an overall coverage area during zone casts.

Since zone casting is a technique that inserts locally targeted, content different from the main programming into the programming being transmitted by one or more boosters. Some zone casting boosters only transmit when the local content is scheduled and do not transmit otherwise. Since the zone casting signals differ from the main signal they will not combine constructively and the main or booster signals may act as interference to the other signal. This is a significant problem if the booster/main signal overlap region is large.

At least some disclosed embodiments provide a system and method that provide technical utility by reducing a size of an overlap region during zone casts, i.e., simultaneous transmission, to reduce the area where the main or booster signals act as interference. Accordingly, at least some disclosed embodiments make use of an alternate main transmitter with an antenna pattern that differs from the main transmitter antenna pattern during zone casts.

FIG. 1 illustrates an example of the usable coverage area for an FM broadcaster using only one main transmitter. FIG. 1 shows an FCC 50.50 signal power contour chart 110 indicative of the protected service contour for a radio station in accordance with FCC guidelines that pertaining to various classes of FM and NTSC (analog) TV stations. As shown in the figure, the result of using only a main transmitter providing main signal coverage provides poor coverage because the actual transmission signal contour 120 does not completely fill the FCC prescribed coverage area. As a result, FIG. 1 illustrates an example in which the coverage area is not able to provide a usable signal power in the entire FCC allowed coverage area.

Figure 2:
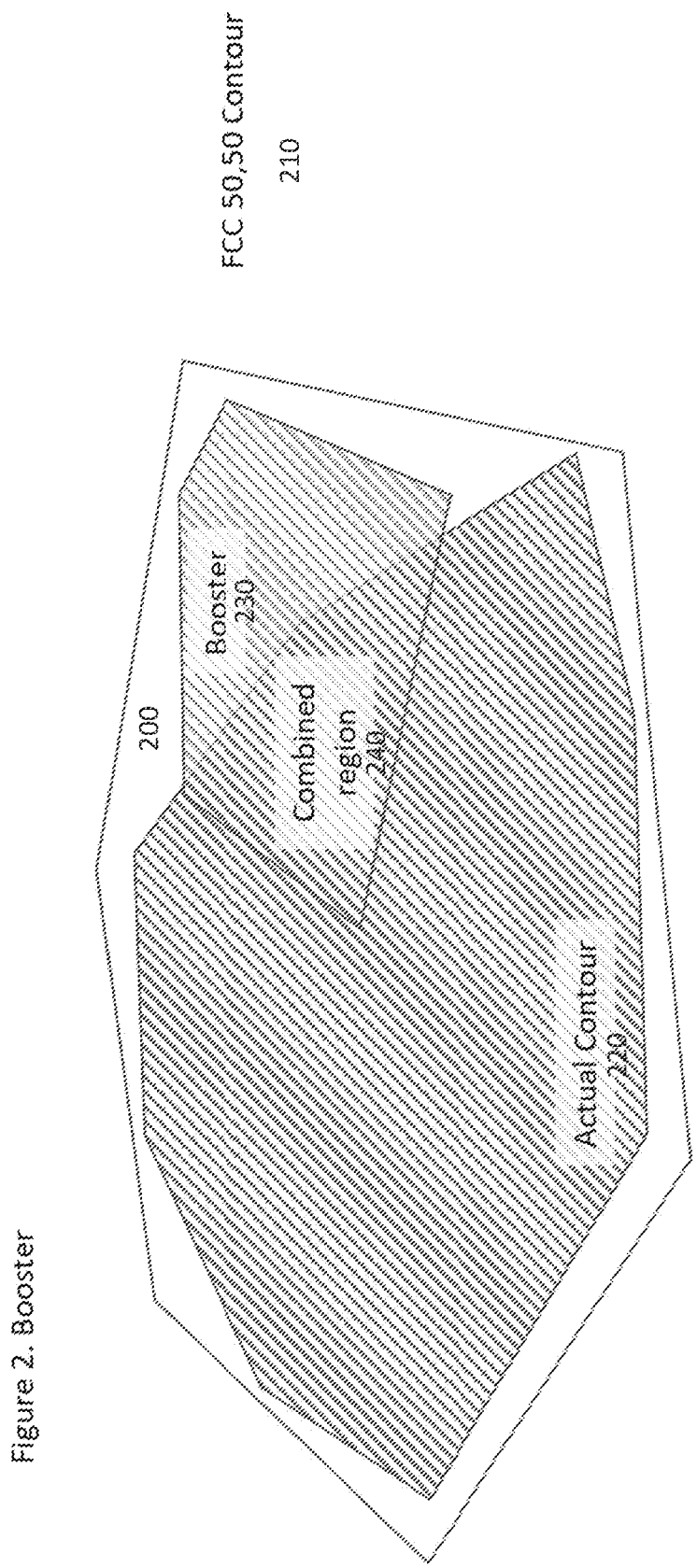
FIG. 2 shows how the addition of a booster transmitter can improve the coverage area by "filling-in" the areas that cannot be reached by the main transmitter.

FIG. 2 illustrates an example of the effect of how the addition of a booster transmitter can improve the coverage area by "filling-in" the areas that cannot be reached by the main transmitter. FIG. 2 shows an FCC 50.50 signal power contour chart 210 indicative of the protected service contour for a radio station in accordance with FCC guidelines that pertaining to various classes of FM and NTSC (analog) TV stations.

In FIG. 2, the main transmitter and the booster transmitter are transmitting the same content. Thus, as shown in FIG. 2, the allowed coverage area 200 is more effectively filled as a result of the actual signal power contour 220 from the main transmitted signal in combination with the signal power contour resulting from the booster transmitter 230. In the combined region 240, the main signal and the booster signal can be combined constructively using known techniques to control the relative delay and power levels of the received signals. More than one booster may be deployed to increase coverage; thus, it should be appreciated that the booster signal power contour 230 may be result of one or more booster transmitters. In particular, U.S. Pat. No. 9,232,481 describes, in detail, a set of techniques for optimizing the overall performance of a system that includes a main transmitter and booster transmitters.

Figure 3:
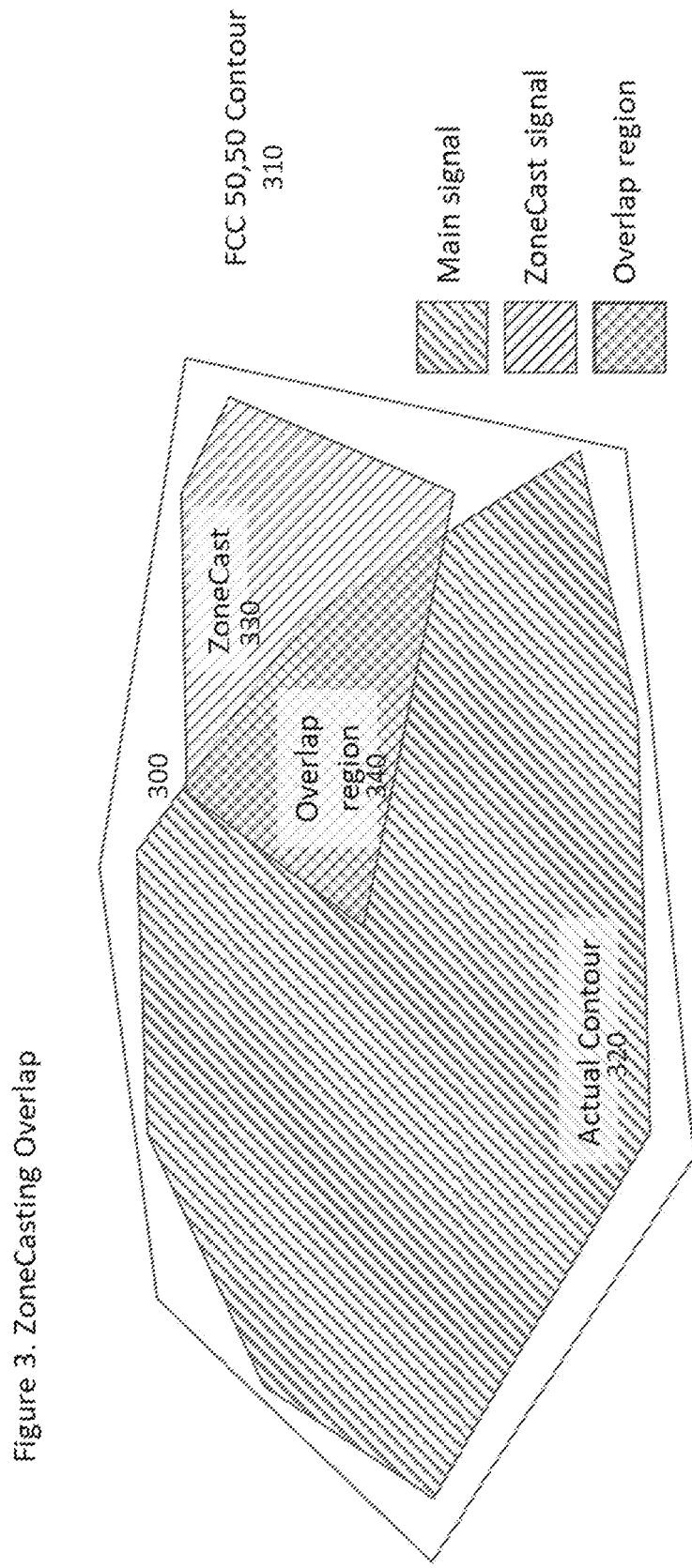
FIG. 3 illustrates an example of the overlap region created by the main and boosters signal during a zone cast when the signals are carrying different programming.

For further understanding, FIG. 3 illustrates an example of the overlap region created by the main and boosters signal during a zone cast, e.g., when the signals are carrying different programming. FIG. 3 shows an FCC 50.50 signal power contour chart 310 indicative of the protected service contour for a radio station in accordance with FCC guidelines that pertaining to various classes of FM and NTSC (analog) TV stations.

As shown in FIG. 3, the main transmitter's signal power contour 320 and the signal power contour 330 of the booster transmitter(s) each include signals that act as interference to the other signal in the overlap region 340. In that region, each signal's power level is comparable to the other's power level. As a result, receivers in this geographic area experience a great deal of interference between the main signal and a zone cast signal. It should be appreciated that, depending on the number of booster signals used to provide zone casted signal contours, multiple overlap regions could result.

Figure 4:
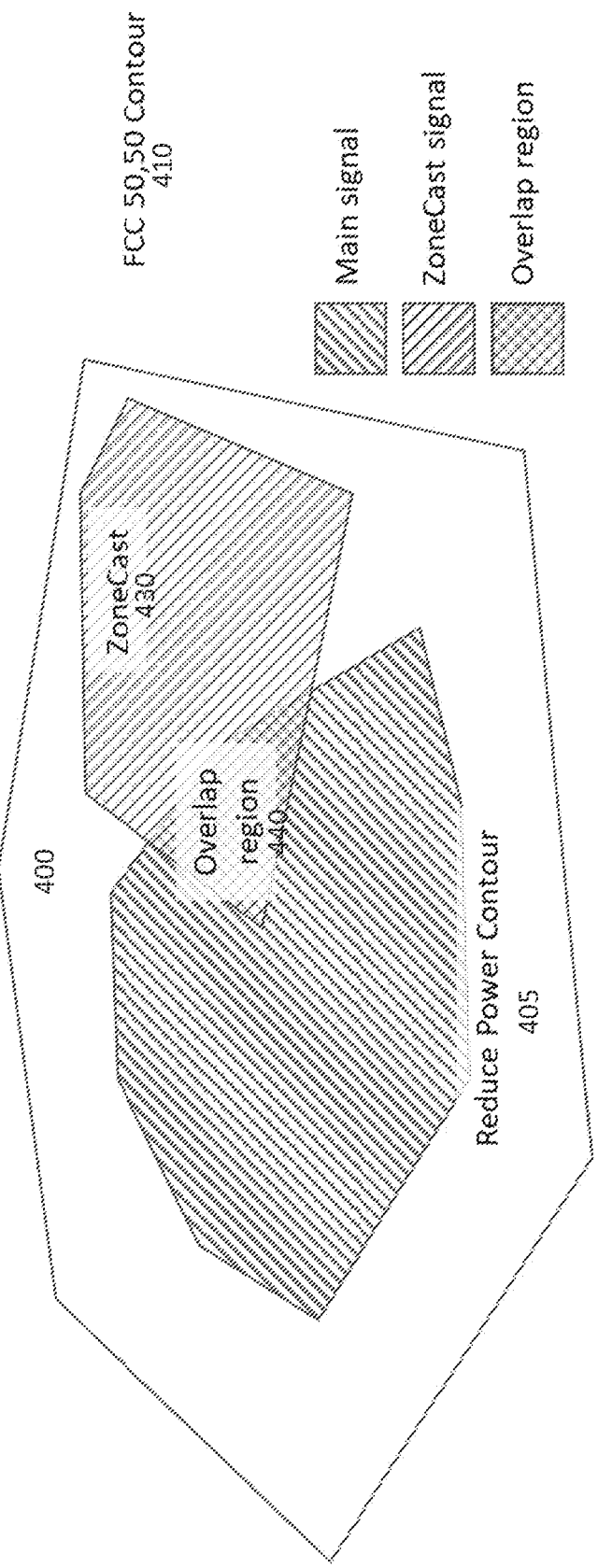
FIG. 4 illustrates how the prior art where the power of the main signal is reduced to reduce the extent of the overlap region.

Still further, FIG. 4 illustrates the effect resulting when the power of the main signal is reduced to reduce the extent of the overlap region. FIG. 4 shows an FCC 50.50 contour chart 410 indicative of the protected service contour for a radio station in accordance with FCC guidelines that pertaining to various classes of FM and NTSC (analog) TV stations. One conventional approach to addressing this issue would be to reduce the main signal power contour 405 in order to reduce the degree of overlap 440 with the zone cast booster signal 430. However, as can be shown in the figure, the overall coverage area within the FCC permitted coverage area 400 is also reduced in areas away from the overlap area.

Figure 5:
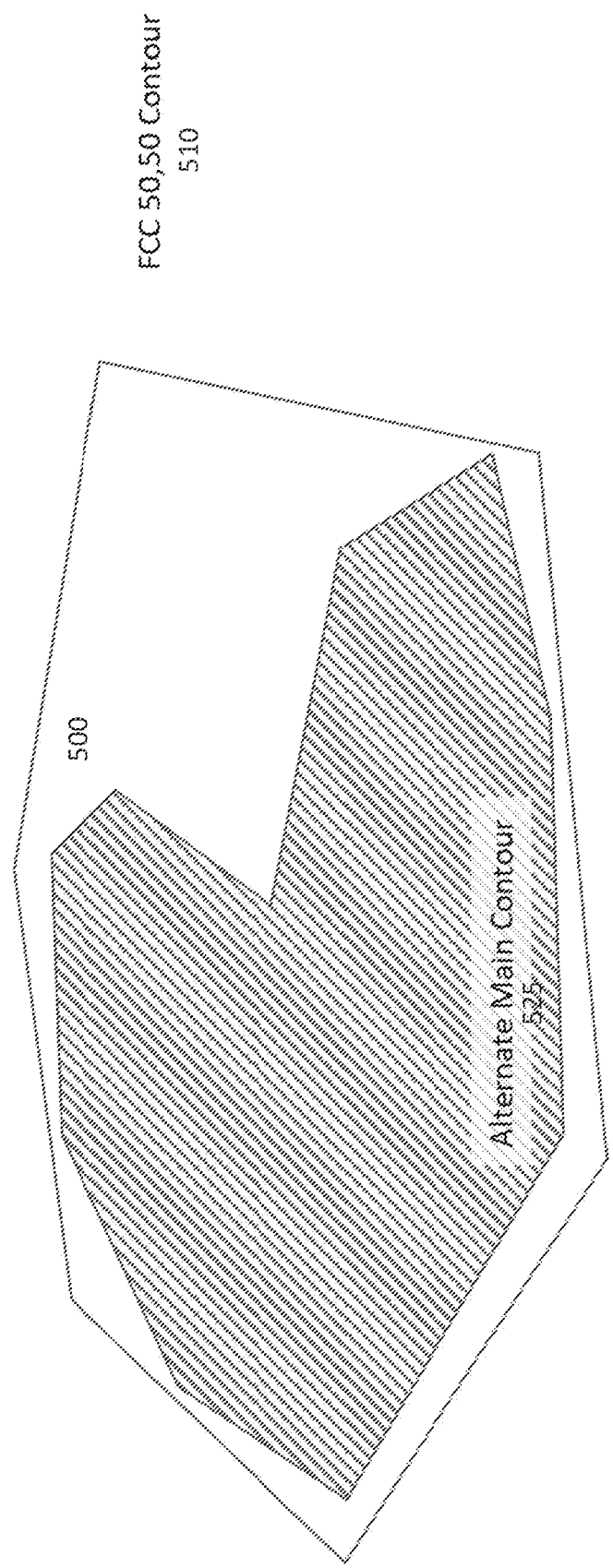
FIG. 5 shows the transmitter antenna pattern for an alternate transmitter for use in accordance with at least one embodiment of the disclosed embodiment.

To the contrary, accordingly, at least some disclosed embodiments make use of an alternate main transmitter with an antenna pattern that differs from the main transmitter antenna pattern during zone casts. Thus, as illustrated in FIG. 5 shows the transmitter antenna pattern for an alternate transmitter. FIG. 5 shows an FCC 50.50 signal power contour chart 510 indicative of the protected service contour for a radio station in accordance with FCC guidelines that pertaining to various classes of FM and NTSC (analog) TV stations. As shown in FIG. 5, the alternate main transmitter power contour 525 may be designed specifically to counteract or work the effect of interference resulting from the booster transmitter interference within the FCC coverage area 500. Thus, the shaping of the alternate main transmitter power contour is significantly different than the main transmitter power contour (see FIG. 1). The alternate transmitter antenna may use the same tower as the main transmitter antenna or may be located on a different tower in a different location. The power level of the alternate transmitter may be the same as or different than the power level of the main transmitter. When the alternate transmitter is being used, the main transmitter is idled, or turned off so as not to transmit.

Figure 6:
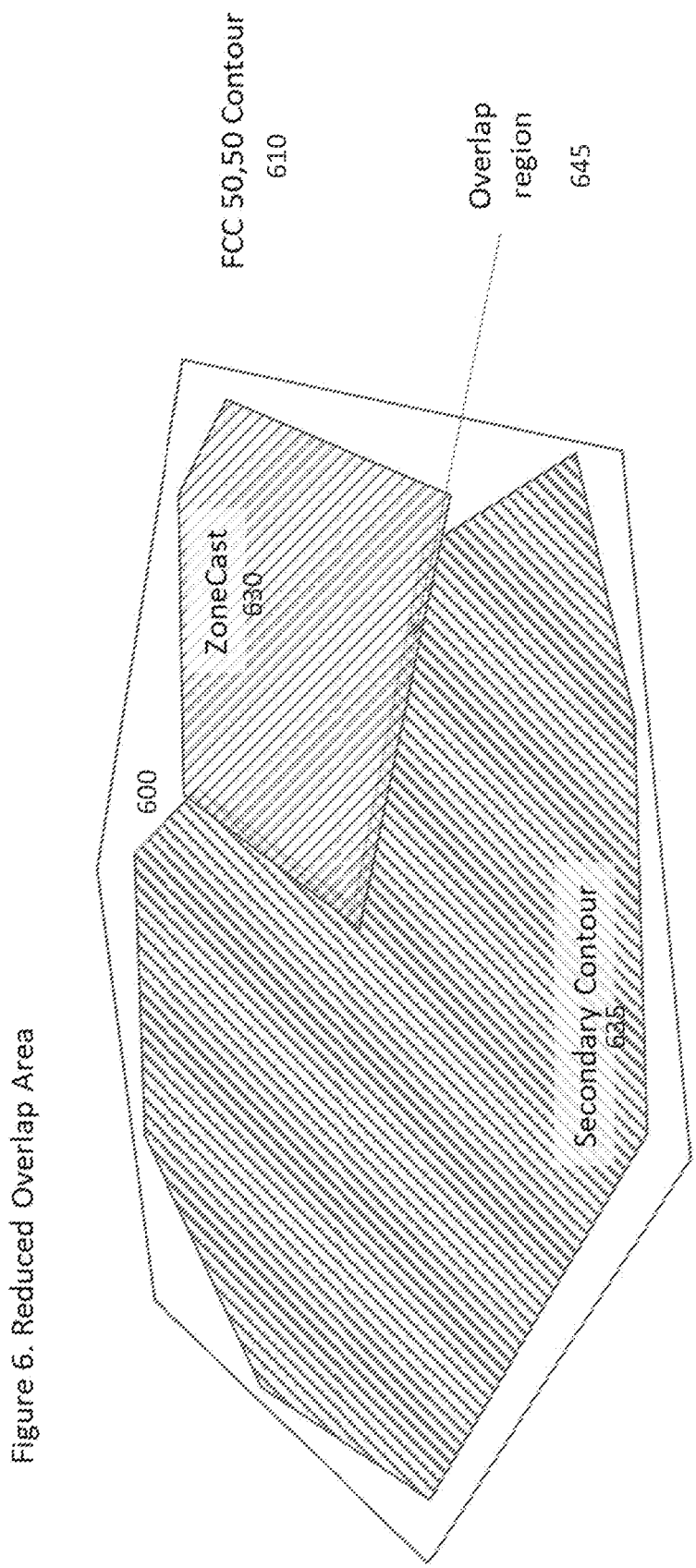
FIG. 6 shows the coverage areas of the alternate main transmitter and the booster zone casting transmitter for use in accordance with at least some of the disclosed embodiments.

FIG. 6 illustrates an example of the coverage areas of the alternate main transmitter (see secondary signal power contour 635 corresponding to the power contour provided by the alternate main transmitter) and that of the zone cast power contour 630 resulting from the booster zone casting transmitter. FIG. 6 shows an FCC 50.50 signal power contour chart 610 that illustrates the significantly enhanced compatibility of the zone casing countours during the geo-targeted transmission period, i.e., during zone casting. As can be shown in the figure, the area of the overlap region 645 where the main and zone casting booster power contours is reduced.

It should be noted that, additional technical utility may be provided in a static modification of the main contour provided by a main transmitter by altering the configuration of the main transmitter to conform to the transmission pattern represented as the secondary contour 635 in FIG. 6. This would be particularly desirable if, for example, the zone casting transmitter (i.e., booster or auxiliary transmitter) is utilized both during zone casting transmissions (in the allocated time slots) and also during main transmitter transmission (for the remainder of the time), e.g., being provided from the same booster.

It should also be noted that while FIG. 6 illustrates the case of a single zone casting booster, there may be multiple zone casting zones created in the same manner as the single zone is illustrated in FIG. 6. The secondary contour would thus become even more complex, but with modern antenna technology, the ability to create complex contours is no longer problematic.

Turning to another aspect of technical utility, at least some disclosed embodiments provide technical utility by providing a mechanism to ensure that the handoffs occur in the gaps between songs, advertisements, or other content of both the main and the zone casting signals. It should be understood that, during zone casting transient radio overlay networks transmit local content at the same time as the main network transmits. Thus, zone casting is an overlay system designed for FM broadcast stations wherein unique local content is overlayed, e.g., transmitted in a sub-region, simultaneously with the wide area FM broadcast signal for limited periods of time.

However, in implementation, listener's FM receivers will lock onto the strongest signal during the zone casting transmission. However, if the zone casting signal is asynchronous with the main signal, then the handover from the main signal could take place in the middle of a song, advertising, or other content. Similarly, when the zone casting transmission ends, the handoff back to the main signal could take place in the middle of a song, advertisement, or other content. As a result, listeners could find the handoffs disruptive and unpleasant.

In implementation, it should be understood that radio broadcast networks own or supply programing to multiple stations. These stations insert nationwide advertising and announcements into their broadcasts from a central studio, which supplies programming to their network of stations. In order to synchronize insertion of advertising content, signaling tones are added to the national broadcast signal to trigger the insertion of local advertising or other content by the individual stations. This is done so that the local advertising signals do not disrupt the national programming. However, transmitted local advertising also uses the same transmitter. Thus, conventionally, the only difference in implementation between national and local advertising is the presence of locally supplied content in place of the national content.

Thus, turning to another aspect of technical utility of the invention, various disclosed embodiments provide improved capability to synchronize operation and transmission of the main transmitter(s) and booster transmitters. In a transient RF overlay network a signal is transmitted that is designed to be stronger than the main signals so that receivers in the zone casting area will hand over to the overlay signal. In FM broadcast overlay systems like the zone casting system, the local content is typically processed and prepared for transmission at one central studio. Studio to Transmitter Links are used to distribute the FM signals to the collection of geographically distributed transmitters.

Figure 7:
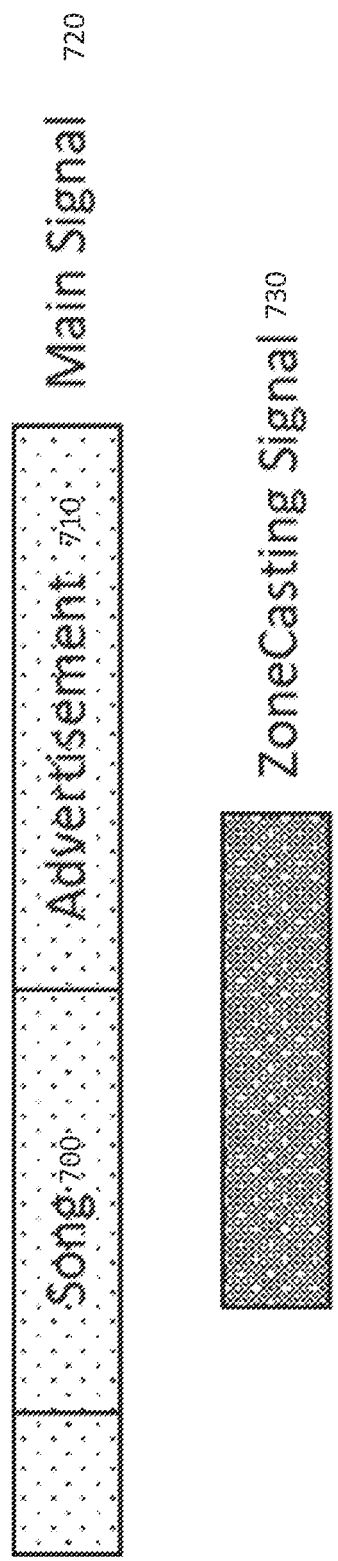
FIG. 7 shows an example of unsynchronized zone casting for reference when considering the technical utility in accordance with at least some of the disclosed embodiments.

FIG. 7 shows an example of unsynchronized zone casting overlap for reference when considering the technical utility of the disclosed embodiments of synchronized zone casting provided in accordance with various disclosed embodiments.

As shown in the figure, if the zone casting signal 730 were to be enabled to interfere with the main signal 720 in an unsynchronized manner, as shown in FIG. 7, then listeners in the zone casting region would hear the song 700 being interrupted at beginning of the zone cast. Likewise, at the end of the zone cast signal output, listeners in that region would return to the main signal in the middle of the advertisement 710.

Figure 8:
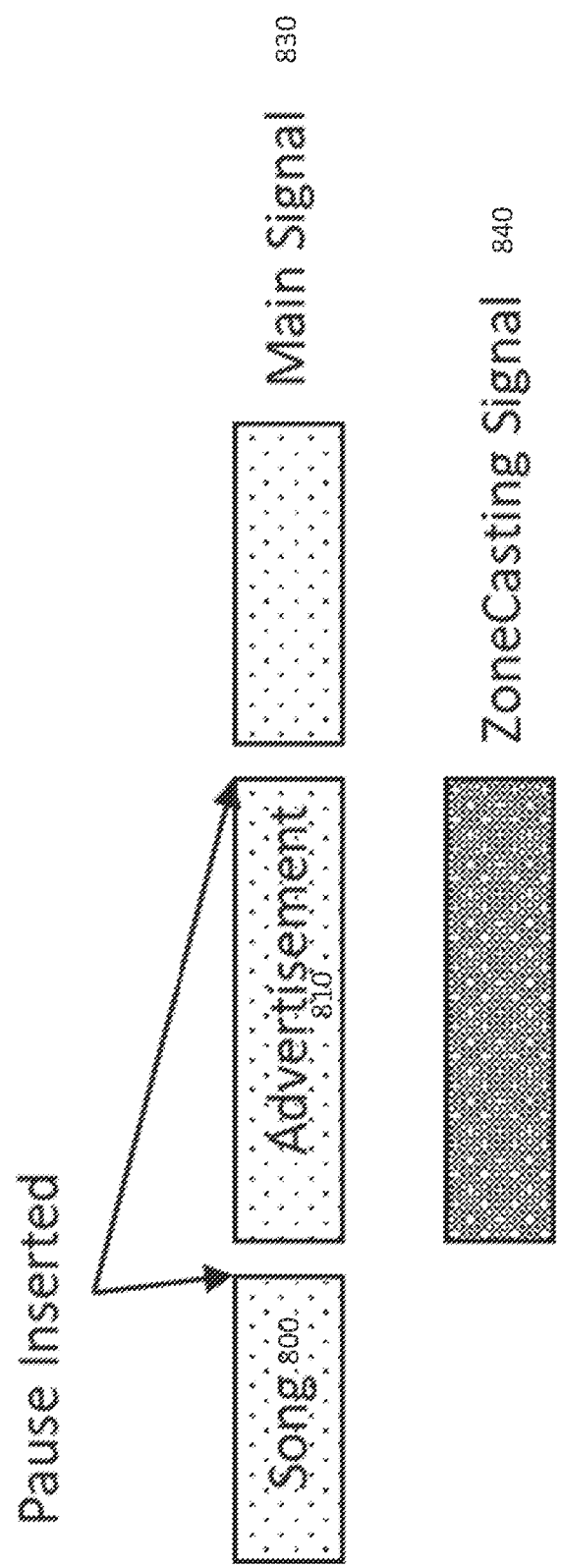
FIG. 8 shows an example of synchronized zone casting in accordance with at least some of the disclosed embodiments.

FIG. 8 shows an example of a synchronized zone casting provided in accordance with various disclosed embodiments.

As shown in FIG. 8, pauses and gaps between content elements in the main signal 830 may be identified or scheduled in advance at known times. Accordingly, the zone casting signal(s) 840 is/are delayed so that their output starts during a pause or gap in the main signal 830, e.g., between the song 800 and the advertisement 810. Thus, the duration of the zone casting signals may be selected to line up with one of the pauses or gaps in the main signal. In this way, the transitions or handoffs from the main signal 830 to the zone casting signal 840 is rendered much less obvious and much less noticeable to listeners. The same is true for the transition at the end of the zone cast transmission.

It should be appreciated that the various disclosed embodiments and their individual aspects and features also may be utilized in the transmission of analog and/or digital radio and television signals. In accordance with various embodiments, the invention may be practiced with, for example, AM, FM or HD Radio™, HD Radio™ is the brand name for In-Band On-Channel (IBOC) digital radio broadcast technology, which can simulcast an existing analog radio station in digital format with less noise and with additional text information.

It should be understood that various disclosed embodiments relate to the broadcasting of both analog radio broadcasting signals and digital radio broadcasting signals. Thus, it should be understood that the embodiments are not limited to analog radio broadcasting and may by utilized in digital audio radio broadcasting, for example, Eureka 147 (also known as Digital Audio Broadcasting (DAB)), 'DAB+, FM band in-band on-channel (FM IBOC) broadcasting including HD Radio (OFDM modulation over FM and AM band IBOC sidebands) and FMeXtra (FM band IBOC subcarriers), Digital Radio Mondiale (DRM) and its extension (DRM+) (OFDM modulation over AM band IBOC sidebands), AM band in-band on-channel (AM IBOC) including HD Radio (AM IBOC sideband) and DRM, Satellite radio including, e.g., WorldSpace, Sirius XM radio, and MobaHo!, Integrated Services Digital Broadcasting (ISDB), Low-bandwidth digital data broadcasting over existing FM radio and Radio Data System (also known as RDS), etc.

Moreover, it should be understood that various connections are set forth between elements in the following description; however, these connections in general, and, unless otherwise specified, may be either direct or indirect, either permanent or transitory, and either dedicated or shared, and that this specification is not intended to be limiting in this respect.

Additionally, it should be understood that the functionality described in connection with various described components of various invention embodiments may be combined or separated from one another in such a way that the architecture of the invention is somewhat different than what is expressly disclosed herein. Moreover, it should be understood that, unless otherwise specified, there is no essential requirement that methodology operations be performed in the illustrated order; therefore, one of ordinary skill in the art would recognize that some operations may be performed in one or more alternative order and/or simultaneously.

Various components of the invention may be provided in alternative combinations operated by, under the control of or on the behalf of various different entities or individuals.

Further, it should be understood that, in accordance with at least one embodiment of the invention, system components may be implemented together or separately and there may be one or more of any or all of the disclosed system components. Further, system components may be either dedicated systems or such functionality may be implemented as virtual systems implemented on general purpose equipment via software implementations.

Unless otherwise expressly stated, it is in no way intended that any operations set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following inventive concepts.

Although the utility of various invention embodiments has been described in connection with the distribution of promotional content, it should be understood that distributed information is not limited to promotional content but may also or alternatively include non-promotional material.

As a result, it will be apparent for those skilled in the art that the illustrative embodiments described are only examples and that various modifications can be made within the scope of the invention.

The invention claimed is:

1. Radio broadcasting equipment comprising:
at least one auxiliary transmitter associated with at least one main transmitter, wherein the at least one main transmitter transmits broadcast area wide programming on a radio frequency for a broadcast area, and wherein the at least one auxiliary transmitter transmits on the same radio frequency as the at least one main transmitter;
an alternate main transmitter for transmitting the broadcast area wide programming on the radio frequency for the broadcast area, wherein the alternate main transmitter transmits on the same radio frequency as the at least one main transmitter and the at least one auxiliary transmitter, and wherein the alternate main transmitter has a power contour specifically designed to minimize interference between a signal transmitted by the at least one auxiliary transmitter and a signal transmitted by the at least one main transmitter during zone casting transmission within the broadcast area associated with the at least one main transmitter; and
at least one processor running software to control synchronization of output of content of the signal transmitted by the at least one main transmitter, the alternate main transmitter and the at least one auxiliary transmitter as well as control synchronization of output of content of the signal transmitted by the at least one auxiliary transmitter with content of the signal transmitted by the at least one main transmitter,
wherein the control synchronization delays the output of the content transmitted by the at least one auxiliary transmitter relative to the output of the content of the signal transmitted by the at least one main transmitter, and
wherein interaction between the signals transmitted by the at least one auxiliary transmitter and the alternate main transmitter reduces a size of an interference overlap resulting from main transmitter signal transmission and auxiliary transmitter signal transmission.

2. The radio broadcasting equipment of claim 1, wherein the broadcast area is a radio broadcasters' listening area.

3. The radio broadcasting equipment of claim 1, wherein the alternate main transmitter is co-located with the at least one main transmitter.

4. The radio broadcasting equipment of claim 1, wherein the radio frequency is a frequency modulation (FM) frequency.

5. The radio broadcasting equipment of claim 1, wherein the at least one auxiliary transmitter is one of a plurality of auxiliary transmitters associated with the at least one main transmitter that are configured to transmit signals at a single and selectable broadcast frequency.

6. The radio broadcasting equipment of claim 1, wherein the at least one main transmitter ceases signal transmission during signal transmission by the alternate main transmitter of the broadcast area wide programming as part of a period of zone casting.

7. The radio broadcasting equipment of claim 1, wherein the at least one auxiliary transmitter and the at least one main transmitter transmit analog radio signals.

8. The radio broadcasting equipment of claim 1, wherein the at least one auxiliary transmitter and the at least one main transmitter transmit digital audio signals.

9. The radio broadcasting equipment of claim 1, wherein the delay of output in the synchronization control includes insertion of at least one pause into at least one gap between content elements in the signal transmitted from the at least one main transmitter in a manner that the output of content in the signal transmitted from the at least one auxiliary transmitter starts during a pause or gap in output of the broadcast area wide programming content transmitted from the at least one main transmitter.

10. The radio broadcasting equipment of claim 1, wherein the at least one auxiliary transmitter is utilized both during zone casting transmissions in allocated time slots and also during main transmitter transmission by the at least one main transmitter for a remainder of transmission time.

11. A method of radio broadcasting comprising:
transmitting auxiliary content, via at least one auxiliary transmitter associated with at least one main transmitter;
transmitting broadcast area wide programming, via the at least one main transmitter on a radio frequency for a broadcast area, wherein the at least one main transmitter and at least one auxiliary transmitter both transmit on the same radio frequency;
transmitting the broadcast area wide programming, via an alternate main transmitter, on the radio frequency for the broadcast area, wherein the alternate main transmitter transmits on the same radio frequency as the at least one main transmitter and the at least one auxiliary transmitter, and wherein the alternate main transmitter has a power contour specifically designed to minimize interference between a signal transmitted by the at least one auxiliary transmitter and a signal transmitted by the at least one main transmitter during zone casting transmission within the broadcast area associated with the at least one main transmitter; and
controlling synchronization, by at least one processor running software, of output of content of the signal transmitted by the at least one main transmitter, the alternate main transmitter and the at least one auxiliary transmitter as well as control synchronization of output of content of the signal transmitted by the at least one auxiliary transmitter with content of the signal transmitted by the at least one main transmitter,
wherein the control synchronization delays the output of the content transmitted by the at least one auxiliary transmitter relative to the output of the content of the signal transmitted by the at least one main transmitter, and
wherein interaction between the signals transmitted by the at least one auxiliary transmitter and the alternate main transmitter reduces a size of an interference overlap resulting from main transmitter signal transmission and auxiliary transmitter signal transmission.

12. The radio broadcasting method of claim 11, wherein the broadcast area is a radio broadcasters' listening area.

13. The radio broadcasting method of claim 11, wherein the alternate main transmitter is co-located with the at least one main transmitter.

14. The radio broadcasting method of claim 11, wherein the radio frequency is a frequency modulation (FM) frequency.

15. The radio broadcasting method of claim 11, wherein the at least one auxiliary transmitter is one of a plurality of auxiliary transmitters associated with the at least one main transmitter that are configured to transmit signals at a single and selectable broadcast frequency.

16. The radio broadcasting method of claim 11, wherein the at least one main transmitter ceases signal transmission during signal transmission by the alternate main transmitter of the broadcast area wide programming as part of a period of zone casting.

17. The radio broadcasting method of claim 11, wherein the at least one auxiliary transmitter and the at least one main transmitter transmit analog radio signals.

18. The radio broadcasting method of claim 11, wherein the at least one auxiliary transmitter and the at least one main transmitter transmit digital audio signals.

19. The radio broadcasting method of claim 11, wherein the delay of output in the synchronization control includes insertion of at least one pause into at least one gap between content elements in the signal transmitted from the at least one main transmitter in a manner that the output of content in the signal transmitted from the at least one auxiliary transmitter starts during a pause or gap in output of the broadcast area wide content transmitted from the at least one main transmitter.

20. The radio broadcasting method of claim 11, wherein the at least one auxiliary transmitter is utilized both during zone casting transmissions in allocated time slots and also during main transmitter transmission by the at least one main transmitter for a remainder of transmission time.

* * * * *